June 2, 1959 E. W. BAUER ET AL 2,889,540

MAGNETIC MEMORY SYSTEM WITH DISTURBANCE CANCELLATION

Filed July 14, 1954 3 Sheets-Sheet 1

INVENTORS
EDWIN W. BAUER
MUNRO K. HAYNES

BY William V. Schelberg
AGENT

June 2, 1959 E. W. BAUER ET AL 2,889,540

MAGNETIC MEMORY SYSTEM WITH DISTURBANCE CANCELLATION

Filed July 14, 1954 3 Sheets-Sheet 2

INVENTORS
EDWIN W. BAUER
MUNRO K. HAYNES

BY William V. Schelberg

AGENT

June 2, 1959 E. W. BAUER ET AL 2,889,540

MAGNETIC MEMORY SYSTEM WITH DISTURBANCE CANCELLATION

Filed July 14, 1954 3 Sheets-Sheet 3

INVENTORS
EDWIN W. BAUER
MUNRO K. HAYNES
BY William V. Schelberg
AGENT

1

2,889,540

MAGNETIC MEMORY SYSTEM WITH DISTURBANCE CANCELLATION

Edwin W. Bauer and Munro K. Haynes, Poughkeepsie, N.Y., assignors to International Business Machines Corporation, New York, N.Y., a corporation of New York Application July 14, 1954, Serial No. 443,284

20 Claims. (Cl. 340—174)

The present invention relates to coincident current magnetic core memory systems and is particularly directed to an arrangement for improving the signal response therefrom.

In arrays of magnetic cores employed for storage of binary information as represented by relative stable remanence states attained thereby, a read signal is generally obtained from a winding embracing each core of a digit plane of the array. Since the cores exhibit hysteresis characteristics having a substantial departure from rectangular form and in themselves are somewhat dissimilar, cores partially excited in the course of interrogation contribute to the production of disturbance signals which may preclude reliable recognition between stored one and zero signal representations produced by an interrogated core.

The present invention contemplates a system for limiting the effects of such disturbance signals and provides means for developing a voltage in a sense which is appository to the partially excited core outputs and in effect cancels the disturbance signals so that a reliable determination between a stored one and a stored zero signal may be made by amplitude comparison.

Accordingly, a principal object of the invention is to provide a system for cancellation of the disturbance signals from half selected cores on read out of a coincident current magnetic memory array.

A more specific object is to provide a system for cancelling disturbance signals and allowing binary zero and one signals to be distinguished by amplitude discrimination.

In employing the output signal obtained from such an array by interrogation of a magnetic core, the signal is conventionally amplified to provide sufficient power to operate logical devices in connection with the apparatus with which it is associated. Electrical impulses applied to the magnetic core at times other than during a read interval develop output signals which are not employed for operation of the logical devices, however, these signals may be of such a magnitude as to charge the interelectrode capacitances or coupling capacitances of the amplifier system to a degree requiring a substantial recovery period before a subsequently available and useful output signal may be amplified. Such a condition increases the overall operating time per cycle of memory unit function and is undesirable. Special amplifier circuits have been designed to shorten the recovery period, however, the problem is more completely solved by cancellation of these deleterious pulses in accordance with a further aspect of the present invention. This cancellation is provided principally to buck out the effects of a so called inhibit pulse applied to the cores during writing and a post-write-disturb pulse which may be applied before read time, and comprises the introduction of voltages in opposition thereto and developed as a result of the application of the inhibit and the post-write-disturb impulses.

A further object of the invention, therefore, is to provide means for reducing the undesirable effects of an inhibit pulse and/or a post-write-disturb pulse and to improve output amplifier recovery time.

2

Other objects of the invention will be pointed out in the following description and claims and illustrated in the accompanying drawing, which disclose, by way of example, the principle of the invention and the best mode, which has been contemplated, of applying that principle.

Figure 1:
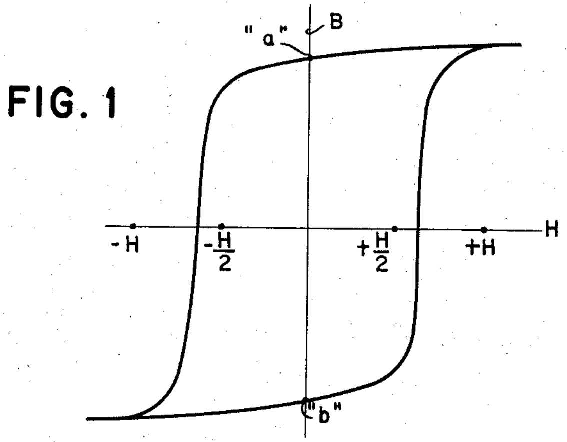
Figure 1 is a curve of the magnetic characteristics of the materials used for memory elements.

The storage of binary information through establishing representative states of magnetization in bistable magnetic devices is well known. In such systems magnetic cores having a somewhat rectangular hysteresis characteristic as shown in Figure 1 are employed, and are driven to one or the other of their stable residual states by energizing windings which embrace the core and apply a magnetomotive force thereto of desired magnitude and direction.

Figure 2:
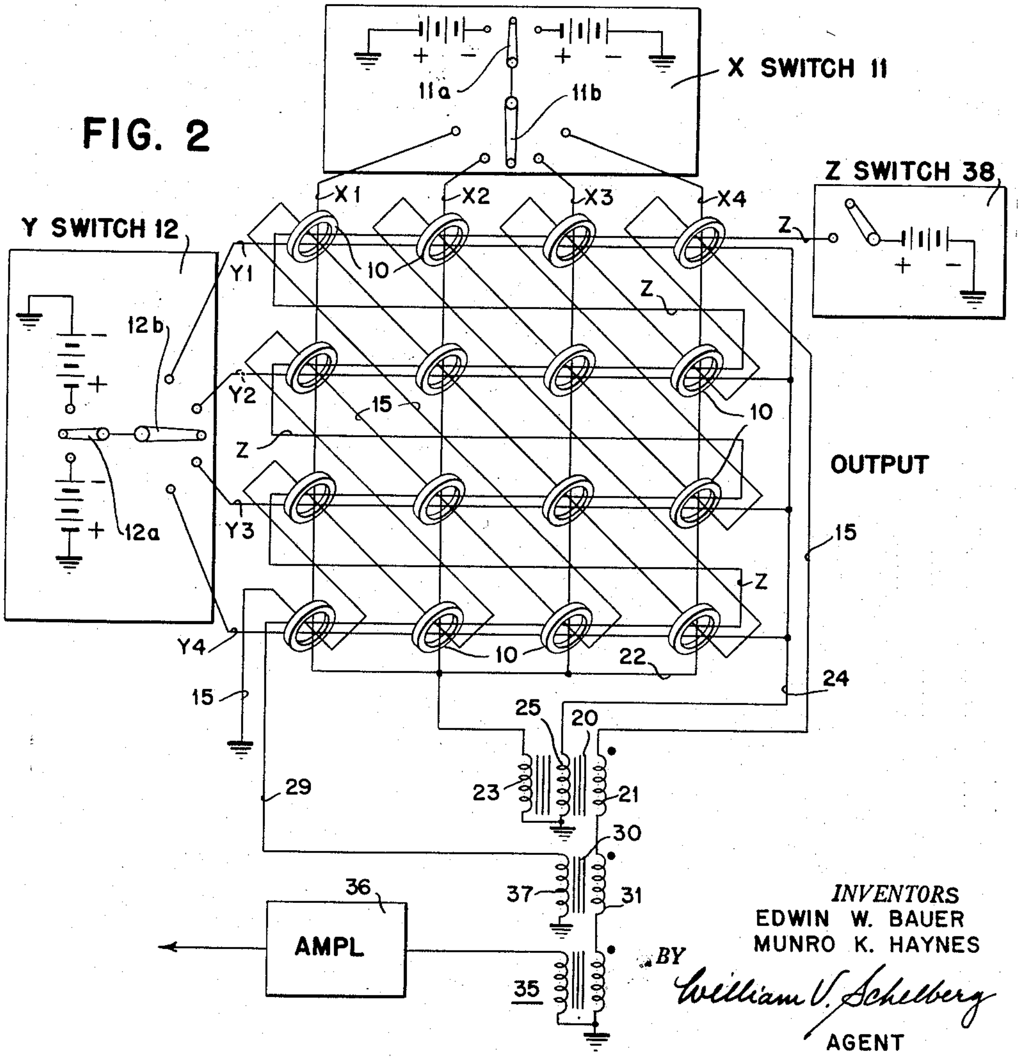
Figure 2 is a diagrammatic representation of a serial two dimensional array of magnetic cores connected in a system illustrating the present invention.

One of the stable remanence states is arbitrarily chosen to represent a binary one, as at point $a$, and the other state, point $b$, then represents a binary zero. When a change from one residual state to the other takes place, as the magnetic field collapses and builds up in the other direction, an output voltage is induced in the windings linking the core and this induced voltage may be used for indicating that a change from one state to the other has occurred.

Where a greater number of cores are used in a memory organ it is convenient to consider them as being connected and arranged in certain geometrical form. Such an array is shown in Figure 2 with cores 10 shown as toroids and positioned in rows and columns. Each column of cores 10 is linked by a winding X having one turn and each row of cores is linked by a winding Y also shown as having a single turn. The form of the cores may vary as well as the number of turns of the X and Y windings as the present invention contemplates the use of these cores and windings in any conventional form.

A coincidence of two input signals is conventionally required to provide a magnetomotive force sufficient to overcome the coercive force of any core and for this purpose an X coordinate switch 11 and a Y coordinate switch 12 is provided. While diagrammatically shown for purposes of explanation, such switch devices may be in the form of a diode matrix with separate X and Y windings on each core for read and write operations, as shown in the copending U.S. application, Serial No. 376,300, filed August 25, 1953, now U.S. Patent No. 2,739,300; a bi-directional switch device such as that shown and described in the article "Ferrites Speed Digital Computers" in the April, 1953 "Electronics" publication; or any other known form. Consider, for example, a core having a magnetic state represented as point $b$ on the curve of Figure 1. Application of a force of $$\frac{+H}{2}$$

magnitude and less than the coercive force, is ineffective to completely flip the core from state $b$ to state $a$, however, a force of +H magnitude causes the magnetic state to be reversed in direction and, upon relaxation of this force, the core remains at point *a*. By applying a pulse providing $$\frac{H}{2}$$

force on one of the vertical windings X and a coincident pulse providing a like force to one of the row windings Y through manipulation of switches 11*a*—11*b* and 12*a*—12*b*, a total magnetomotive force of H is developed in the core with which the selected X and Y lines intersect. Only this core will then change states, however, each of the other cores embraced by the X and Y winding will have been subjected to $$\frac{H}{2}$$

magnetomotive force. An output winding 15 interlinks each of the cores in the four by four array illustrated and the voltages developed therein are a composite of the effects developed in all of the cores. In storing a binary one representation in a selected core, the half-select-write pulses may cause overload conditions in some sensing schemes or the sense winding circuits may not be activated, however, on interrogation to determine which one of the two binary representations is stored in a particular core, the effects of the half selected cores may be such as to obliterate the output signal. To read the selected core, a pulse is applied to the X winding and to the Y winding through the switches 11 and 12 in a sense opposite to that used for writing. This causes a total mmf of —H to be provided at the core at the intersection of the pulsed lines and, if it stands at point *a*, a relatively large change in flux is obtained. If the core stands at point *b*, a small flux change occurs due to departure of the cores from an ideal rectangular characteristic. The half selected cores experience some flux change causing a voltage to develop in the output winding 15 which contributes to the total signal obtained and may be of such magnitude cumulatively in adding to or subtracting from the output of the selected core that the latter cannot be distinguished as a one or zero signal. To avoid this problem to a degree, the output winding 15 is conventionally wound in zig-zag fashion so as to cancel out some of the half selected core outputs, however, this arrangement allows the signal to be bipolar. In accordance with the illustrated embodiment a unipolar sense winding is employed wound through each of the cores 10 in the same direction, however, both unipolar and bipolar sense windings have been used successively as will be later described in connection with Figure 4 and Figure 6. With the unipolar sense winding arrangement, each half selected core in the selected row and column contribute to the output signal developed in winding 15. In accordance with the present invention this signal contribution is cancelled out by provision of a bucking voltage in series with the sense winding. For this purpose a cancelling signal generating core 20 is provided having a secondary winding 21 connected in series with the winding 15. The lower terminal of each of the column windings X of the array is connected to a common bus 22 which is coupled to a first primary winding 23 that is inductively related with the core 20. Similarly, the row windings Y of the array are connected at one terminal to a common bus 24 and to a second primary winding 25 that is inductively associated with the bore 20. A single primary winding may be employed rather than both of the windings 24 and 25 by connecting the leads 22 and 24 and returning the X and Y selecting signals to ground through a common winding.

The core 20 may be made of the same magnetic materials as the memory cores 10 so as to vary in the same fashion with respect to temperature and driving current conditions to which they are both subjected, however, satisfactory operation is obtained without this provision. On selection of a particular core for interrogation, the switches 11 and 12 are manipulated and a pulse of current flows through the selected X and Y windings and then through the windings 23 and 25 of the cancelling core 20. A voltage is developed in winding 15 of the array due to each of the half selected cores 10, however, an opposing voltage is now developed in the winding 21. This opposing voltage may be adjusted, for example by varying the number of turns of the secondary 21, so as to substantially equal the half selected core inputs. This compensation need not be precise however, and in fact may amount to an over compensation. If adjusted for compensating a so called worst condition, then the zero read out signal for other conditions would be negative with satisfactory discrimination of a one or zero read out of the interrogated core made on a basis of amplitude discrimination. The improved system may function satisfactory with amplitude discrimination if the half-selected core outputs are under or over compensated, and in either case, sensing on a time selection or amplitude discrimination basis is greatly improved. It is to be noted that with a so-called worst condition over compensated, a zero signal is always negative and the presence of a positive signal indicates a binary one while the absence of a positive signal indicates a zero.

A modification of the circuit is contemplated in staggering application of the X and Y selecting currents and providing a compensating voltage only for the delayed pulse and requiring only one of the primaries.

The cancellation technique may be employed with memory arrays using a post-write-disturb pulse in which the half-select read out contributions to the output signal are lessened with appropriate adjustment of the cancelling voltage provided by the winding 21. Additionally, the cancelling arrangement may be used in conjunction with a system providing integration of the output signal as described in the copending United States patent application Serial Number 442,013, filed in the name of Munro K. Haynes on July 8, 1954.

As mentioned heretofore, it is conventional in the art to amplify the output signal from the memory matrix, however, due to voltages to which the amplifier is subjected at times other than the read out interval, the amplifier recovery time needed has slowed down the operating cycle since the read signals may not be detected and augmented until the interelectrode capacitances and coupling capacitances of the amplifier have discharged. The effects of an inhibit pulse applied to a memory array during the write interval, and of a post-write-disturb pulse which may be applied to the matrix between the write and read intervals, is particularly detrimental in this respect and in compensating for this undesired voltage a further cancelling transformer 30 is provided in accordance with an additional feature of the invention. The core of transformer 30 may be fabricated of material similar to that of the memory cores and the core 20 so as to exhibit similar characteristics under like conditions of use. As shown in Figure 2, the core 30 is inductively associated with a winding 31 connected in series opposition with the sensing winding 15 like the winding 21, with the sensing circuit coupled through a transformer 35 to the input of an amplifier 36. A primary winding 37 is associated with the core 30 and is connected through a lead 29 in series with a winding designated Z linking each of the cores 10 in the two dimensional array. The Z winding is normally employed for selection of a particular plane of cores in a cubical array through inhibit pulsing as will be described hereinafter in connection with Figure 3, however, the post-write-disturb pulse may be applied via this winding by closure of a Z plane switch 38. Each of the cores 10 develop an output signal as a result of this pulse however, as the Z winding current also flows through the winding 37, an opposing voltage is developed simultaneously in the winding 31, preventing the undesired reaction in the amplifier.

The technique of cancelling out the effects of a post-write-disturb pulse, while shown in connection with cancellation of the half-selected read cycle core outputs, is not limited to use with such a system but may be employed in any other memory system with or without half select signal cancellation. For example, in the system employing output signal integration as described in the aforementioned patent application, Serial No. 442,013, filed July 8, 1954.

Figure 3:
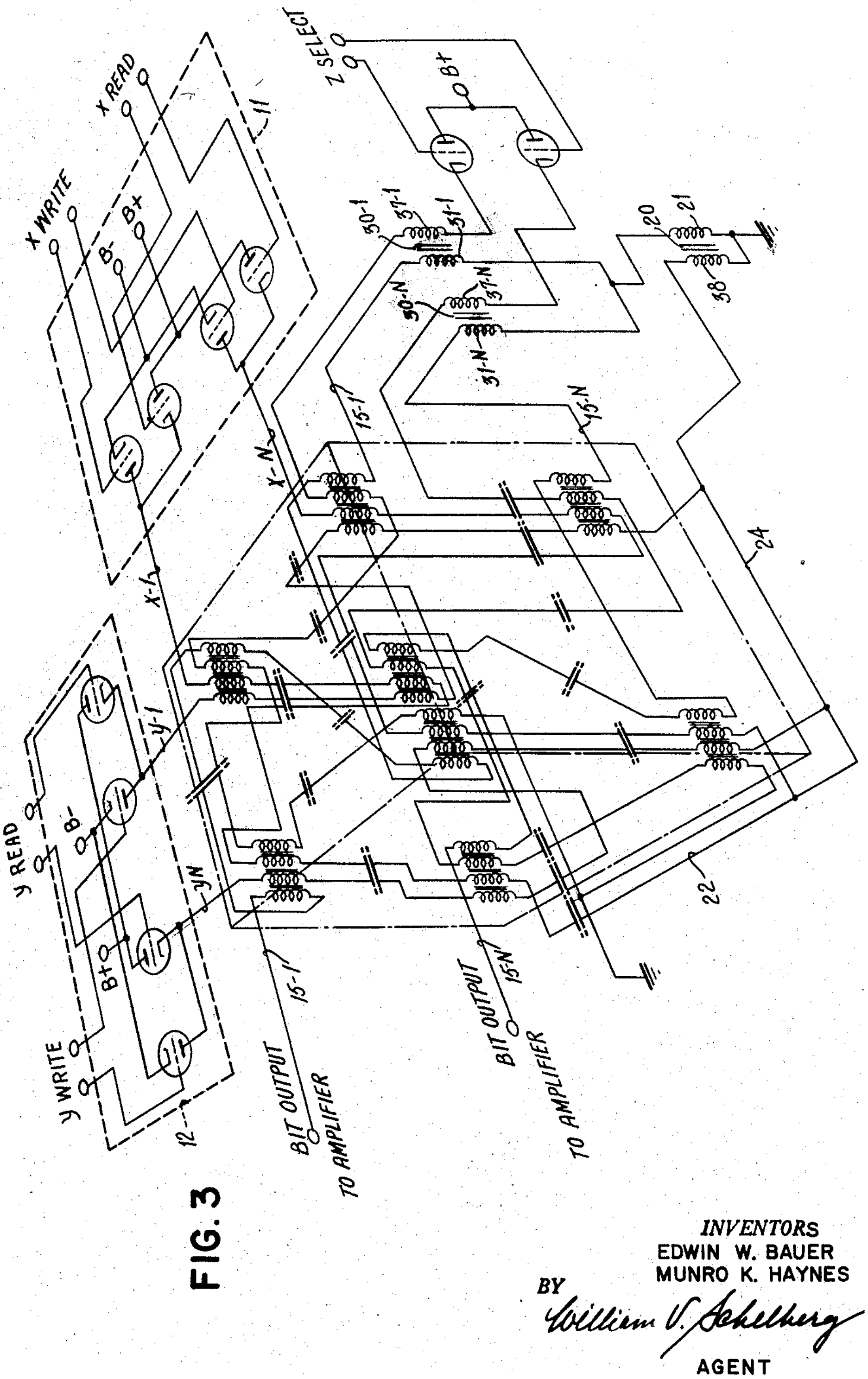
Figure 3 is a circuit diagram illustrating the invention as employed with a multi-dimensional memory array.

A two dimensional serial memory array as described above has utility in many applications and has been utilized in the description of the invention because of its simplicity, however, where a large capacity memory is required the cores may be arranged in a cubical or three coordinate dimensional form for compactness. Such an array may be considered as a stacked group of two dimensional matrices each comprising a Z plane. Such a cubical arrangement is illustrated in Figure 3 showing the connections for the cancellation transformers provided in accordance with the present invention. A cubical array representing any desired capacity is illustrated having only the four corner cores 10 and associated windings schematically shown to avoid confusion of the drawing. Each X—Y plane is similar to the two dimensional array shown in Figure 2 but with the Z winding provided for each individual Z plane. In writing a binary word, a two selection dimension address (X and Y) selects a word line and operation through the third dimension (Z) activates the several core elements forming the line in accordance with the character of the corresponding word bits. The word line is determined by the intersection of a selected X and Y planes and extends through a plurality of Z planes so as to comprise a number of the cores 10 equal to the number of bits of the word. Energization of a selected X and a selected Y line provides $$\frac{+H}{2}$$

magnetomotive force individually, or a total of +H force, allowing each core in the word line to change remanence states, however, energization of selected bit plane or Z windings provides an inhibiting force of $$\frac{-H}{2}$$

to certain of the word line cores so that no net change takes place in those cores. In other words, with each core initially set at zero, each would register and store in a binary one unless inhibited by the Z plane pulse.

In reading out a binary word, the X and Y selection windings which determine the word are energized to jointly provide a magnetomotive force of —H magnitude to each of the cores of the word line. A sense winding 15 is provided for each Z plane and the presence or absence of an output signal on the sense winding for each bit of the word indicates if a binary one or zero has been stored.

The connections for the cancelling transformers are shown in the three coordinate array with an individual core 30 provided for each Z plane and single core 20 for the several X and Y planes. Only a single primary winding 38 is provided for the latter with the X bus 22 and the Y bus 24 connected in common thereto rather than separate connections to individual primaries as shown in Figure 2. Either arrangement is considered equivalent and further, a separate core 20 may also be provided for each plane rather than the single core 20 for the entire array as illustrated.

In applying an inhibiting pulse during write time as described above, selected ones of the Z plane windings Z1 to ZN are pulsed and the associated primary windings

37–1 to 37–N cause a corresponding contribution signal to develop in the secondary windings 31–1 to 31–N of such polarity as to cancel the effects thereof developed in the several sense windings 15–1 to 15–N.

In a similar manner, when employing a post-write-disturb pulse, each Z plane winding Z–1 to Z–N is pulsed between write and read time and the primaries 37 cause a cancelling voltage to be developed in the secondaries 31 to nullify the effects developed in the sensing windings as provided by the memory cores 10.

In the embodiment illustrated in Figure 3, the sense or output windings are wound to provide a unipolar signal like that shown in Figure 2, however, a bipolar sense winding may be employed as mentioned previously. This type of winding is threaded through adjacent diagonals of the several Z planes of cores so that the voltages developed in alternate diagonals are in opposition and half-selected core outputs as well as the outputs due to inhibiting and disturbing pulses tend to be partially cancelled. In lieu of a zig-zag winding, the cores may be arranged so that the sense winding passes through each core in an opposite direction with the same result and in either case resulting in the polarity of a read out signal from a core being dependent upon its position in the array.

Figure 4:
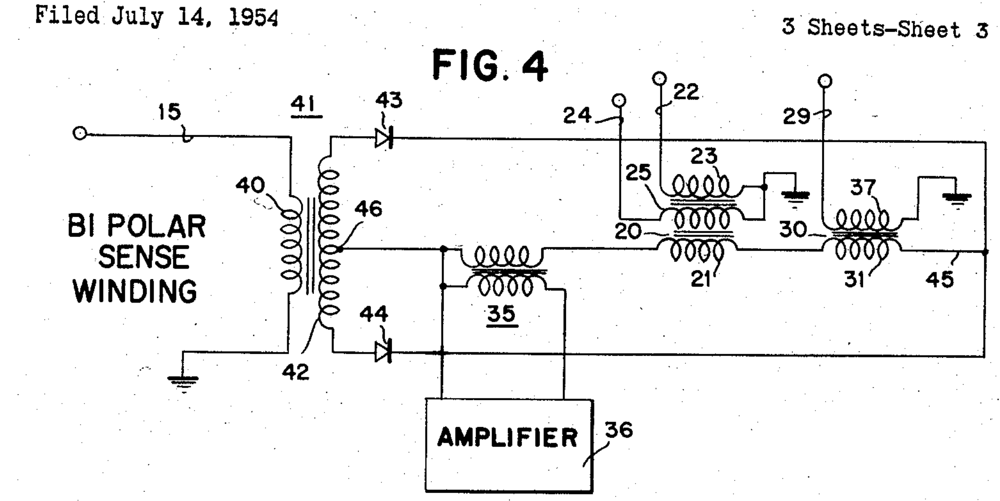
Figure 4 illustrates circuitry for employing the invention with an array having a bi-directional sense winding.

As illustrated in Figure 4, the principles of cancellation described may be employed in systems where a bipolar sense winding is used. Here the sense winding output is designated as the lead 15 and is connected to the primary 40 of a transformer 41 having a secondary winding 42. The terminals of the secondary winding are connected through individual diodes 43 and 44 and to a common return path 45 connected to a center tap 46 to form a full wave rectifier. The secondary windings 21 and 31 of the cancelling transformers are series connected in the lead 45, as is the output transformer 35 to which the amplifier 36 is coupled. Each of these elements has been labeled to correspond with the designations employed for them in Figure 2 for sake of clarity. It is to be understood that either one of the cancelling transformers may be employed alone in this as well as the previously described systems where it is desired to provide cancellation only for the half select read outputs or the effects of the inhibit and post-write-disturb pulses.

Figure 5:
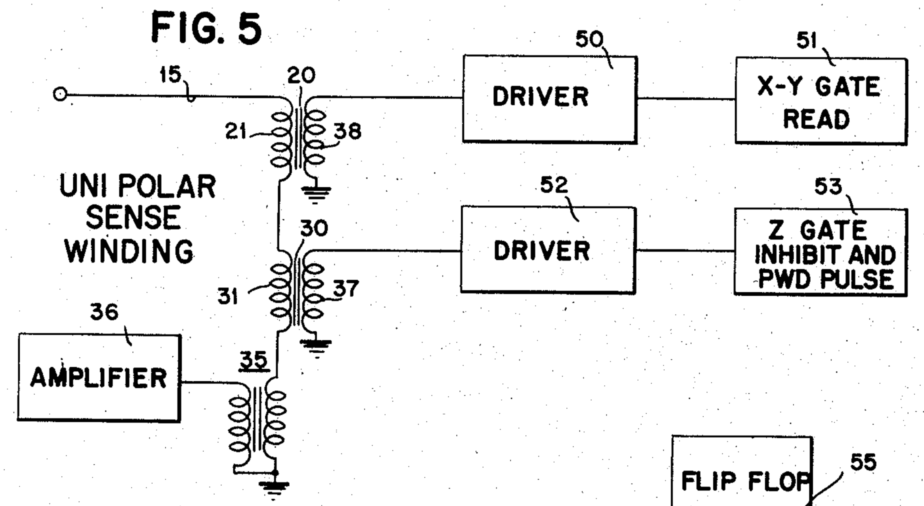
Figures 5 and 6 illustrate the use of an external pulse source for cancelling disturbance effects with unipolar and bipolar sense windings.

Further, the principles of cancellation may be accomplished through the use of an external pulse source rather than from the select, inhibit or post-write-disturb pulses directly, as shown, however, the inherent self-regulation provided is considered advantageous. As an example of the use of an external pulse source with a unipolar sensing system, reference is now made to Figure 5 where the sense winding 15 is shown connected as in Figure 2 but with the windings 23 and 25 combined as a winding 38 and pulsed by an external driver source 50 each time the read gate 51 is activated and the winding 37 pulsed by a driver 52 when a Z plane gate 53 is activated on application of an inhibit or post-write-disturb pulse.

Figure 6:
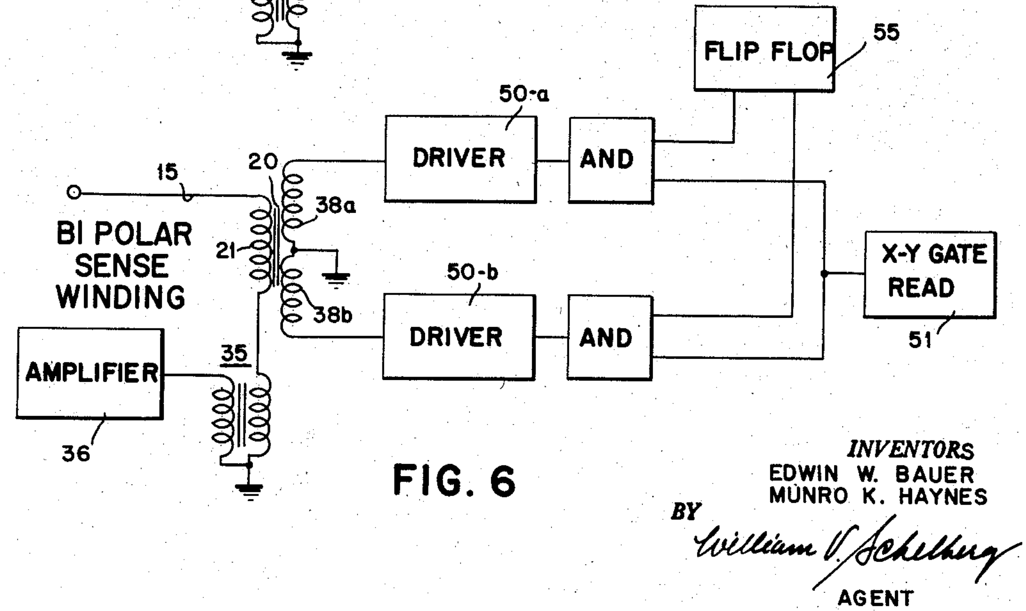

An external driver pulse source may also be employed in instances where a bipolar sense winding is used, as illustrated in Figure 6. Here the cancelling transformer is shown only for elimination of the half select write pulses and is provided with two primary windings **38*a* and 38*b* oppositely poled to provide a cancelling voltage in accordance with the polarity of the bit core interrogated as determined by its address and as controlled by a flip flop 55**.

While the cancelling voltages as described in the system have been illustrated as applied to the primary winding circuit of the amplifier transformer 35, it is obvious that similar results may be obtained by their application to the secondary circuit or directly to the amplifier device 36, and it is to be understood that any equivalent means for causing a cancellation of the undesired impulses is contemplated. Further, while arrays of limited size, employing 2 to 1 selection ratios have been used for purposes of illustration and explanation of the invention, memory organs of any magnitude with other selection ratios and with a plurality selection dimensions are to be considered within the scope of the claims.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A memory device for registering electrical impulses representative of binary digits by relative states of magnetic remanence, comprising a plurality of bistable magnetic cores arranged in a multi-dimensional array, actuating windings embracing groups of said cores in each of a plurality of selection dimensions whereby coincident application of electrical impulses of one polarity in certain of said selection dimensions causes that core jointly energized thereby to assume a first stable state of remanence in representing one binary digit and coincident application of electrical impulses of the other polarity in said certain selection dimensions causes that core jointly energized thereby to assume a second stable state of remanence in representing the other binary digit, output sense windings embracing each core of said multi-dimensional array in which voltages are induced on pulsing at least one of said actuating windings, and means comprising a transformer connected with said output sense windings for developing a voltage cancelling the voltages produced in said output sense windings due to other than that developed by a selected core as it changes from one to the other stable remanence state, said transformer including control winding means series connected with at least one of said actuating windings.

2. In a device for registering electrical impulses represented by relative states of magnetic remanence, a plurality of bistable magnetic storage cores arranged in rows and columns, a selection winding embracing the cores in each particular column, a selection winding embracing the cores in each particular row, means for applying an electrical impulse to a selected one of said column windings in coincidence with the application of an electrical impulse to a selected one of said row windings to cause that core linked by both said energized windings to assume a first remanence state in representing a binary digit, means for selectively applying an electrical impulse of opposite sense to one of said row and column windings in coincidence to cause the core jointly energized thereby to assume a second remanence state, an output winding linking each of said plurality of cores and in which a signal is developed on switching of a selected core from said first to said second remanence state, and means comprising a single pulse transformer having a secondary winding and at least one primary winding, said secondary winding being connected in series with said output winding for developing a voltage in opposition to disturbance signals developed thereon as a result of partial excitation of certain of said cores upon energization of the primary winding thereof.

3. Apparatus as set forth in claim 2 including an external pulse source coupled to the primary winding of said transformer and adapted to be actuated in coincidence with said row and column windings.

4. Apparatus as set forth in claim 2 wherein said pulse transformer has similar magnetic characteristics to said storage cores and primary windings individually coupled to said row and column windings.

5. A memory device for registering electrical impulses representative of binary digits by relative states of magnetic remanence, comprising a plurality of bistable magnetic cores arranged in a multi-dimensional array, actuating windings embracing groups of said cores in each of a plurality of selection dimensions whereby coincident application of electrical impulses of one polarity in certain of said selection dimension causes that core jointly energized thereby to assume a first stable state of remanence in representing one binary digit and coincident application of electrical impulses of the other polarity in said certain selection dimensions causes that core jointly energized thereby to assume a second stable state of remanence in representing the other binary digit, bipolar sense windings embracing each core of said multi-dimensional array in which voltages are induced on pulsing at least one of said actuating windings, and means comprising a transformer connected with said sense winding for developing a voltage cancelling the voltages produced in said sense windings due to other than that developed by a selected core as it changes from one to the other stable remanence state, said transformer comprising a secondary winding series connected with said sense winding and a primary winding energized concurrently with said actuating windings.

6. A memory device for registering electrical impulses representative of binary digits by relative states of magnetic remanence, comprising a plurality of bistable magnetic cores arranged in a cubical array, selection windings embracing groups of said cores in each coordinate dimension thereof whereby coincident application of electrical impulses of one polarity to two of said windings causes that core jointly energized thereby to assume a first stable state of remanence in representing one binary digit and coincident application of electrical impulses of the other polarity to said two windings causes that core jointly energized thereby to assume a second stable state of remanence in representing the other binary digit, output windings embracing each core of said array in which voltages are induced on pulsing at least one of said windings, and means comprising a transformer connected with said output windings for developing a voltage cancelling the voltages produced in said output windings due to other than that developed by a selected core as it changes from one to the other stable remanence state, said transformer having a primary winding connected with at least one of said selection windings.

7. Apparatus for registering electrical impulses representative of binary digits by relative states of magnetic remanence, comprising a plurality of bistable magnetic cores arranged in a multi-dimensional array, actuating windings embracing groups of said cores in each of a plurality of selection dimensions whereby coincident application of electrical impulses of one polarity in at least two selection dimensions causes that core jointly energized thereby to assume a first stable state of remanence in representing one binary digit and coincident application of electrical impulses of the other polarity in at least two selection dimensions causes that core jointly energized thereby to assume a second stable state of remanence in representing the other binary digit, sense windings embracing each core of said multi-dimensional array in which voltages are induced on pulsing at least one of said actuating windings, pulse means coupled to said actuating windings and operative to cause each of said cores linked thereby to assume a disturbed remanence state, and means coupled with said sense windings for cancelling the effects developed therein due to the operation of said pulse means, said means comprising a pulse transformer having a secondary winding series connected with said sense winding and a primary winding energized concurrently with said pulse means.

8. Apparatus as set forth in claim 7 wherein said primary winding is series connected with at least one of said pulsed actuating windings.

9. Apparatus as set forth in claim 7 including a further pulse source, said primary winding being connected with said further pulse source.

10. Apparatus for registering electrical impulses representative of binary digits by relative states of magnetic remanence, comprising a plurality of bistable magnetic cores arranged in a multi-dimensional array, actuating windings embracing groups of said cores in each of a plurality of selection dimensions whereby coincident application of electrical impulses of one polarity in at least two of said selection dimensions causes that core jointly energized thereby to assume a first stable state of remanence in representing one binary digit and coincident application of an inhibit impulse of the other polarity to windings in at least one other of said selection dimensions causes that core jointly energized by said windings to remain at a second stable state of remanence in representing the other binary digit, sense windings embracing each core of said multi-demensional array and in which voltages are induced on pulsing at least one of said actuating windings, and means coupled with said sense windings for cancelling the effects developed therein due to application of said inhibit pulse, said means comprising a transformer having a secondary winding series connected with said sense winding and a primary winding energized concurrently with said inhibit pulse.

11. Apparatus as set forth in claim 10 wherein said primary winding is connected with the winding corresponding with said at least one other of said actuating windings.

12. Apparatus as set forth in claim 10 including an external pulse source, said primary winding being energized by said external pulse source at a time corresponding with application of said inhibit pulse.

13. A memory device for registering electrical impulses representative of binary digits by relative states of magnetic remanence, comprising a plurality of bistable magnetic cores arranged in a multi-dimensional array, windings embracing groups of said cores in each of a plurality of selection dimensions whereby coincident application of electrical impulses of one polarity to windings in certain of said selection dimensions causes that core jointly energized thereby to assume a first stable state of remanence in representing one binary digit and coincident application of electrical impulses of the other polarity to windings in said certain selection dimensions that causes that core jointly energized thereby to assume a second stable state of remanence in representing the other binary digit, output windings embracing each core of said array and in which voltages are induced on pulsing at least one of said windings, means comprising a transformer having a secondary winding coupled with said output windings and a primary winding coupled with the windings of at least one of said dimensions whereupon a cancelling voltage is developed in said secondary winding in opposition to that developed in said output windings by those cores excited in only one of said selection dimensions.

14. A memory device for registering electrical impulses representative of binary digits by relative states of magnetic remanence, comprising a plurality of bistable magnetic cores arranged in a multi-dimensional array, windings embracing groups of said cores in each of a plurality of selection dimensions whereby coincident application of electrical impulses of one polarity in any two of said selection dimensions causes that core jointly energized thereby to assume a first stable state of remanence in representing one binary digit and coincident application of electrical impulses of the other polarity in said two selection dimensions causes that core jointly energized thereby to assume a second stable state of remanence in representing the other binary digit, output windings embracing each core of said multi-dimensional array and in which voltages are induced on pulsing at least one of said windings, and means comprising a transformer connected with said output windings for developing a voltage in opposition to and cancelling voltages produced in said output windings due to that developed on application of inhibit and post-write-disturb pulses to other windings in said selection dimensions, said transformer having a secondary winding series connected with said output windings and primary winding means energized by said inhibit and post-write-disturb pulses.

15. Apparatus for registering electrical impulses representative of binary digits by relative states of magnetic remanence, comprising a plurality of bistable magnetic cores arranged in a multi-dimensional array, windings embracing groups of said cores in each of a plurality of selection dimensions whereby coincident application of electrical impulses of one polarity in any two of said selection dimensions causes that core jointly energized thereby to assume a first stable state of remanence in representing one binary digit and coincident application of electrical impulses of the other polarity in said two selection dimensions causes that core jointly energized thereby to assume a second stable state of remanence in representing the other binary digit, output windings embracing each core of said multi-dimensional array and in which voltages are induced upon pulsing at least one of said windings, pulse means coupled to the winding corresponding with a third selection dimension, means comprising a transformer having a secondary winding connected with said output winding and a primary winding series connected with the winding corresponding with said third selection dimension for cancelling out the effects due to operation of said pulse means, and a further transformer having a secondary winding connected with said output winding and a primary winding series connected with the windings of said two selection dimensions whereupon a cancelling voltage is developed in opposition to that developed in the output winding by those cores excited by a winding in only one of said two selection dimensions.

16. Apparatus for registering electrical impulses representative of binary digits by relative states of magnetic remanence, comprising a plurality of bistable magnetic cores arranged in a multi-dimensional array, windings embracing groups of said cores in each of a plurality of selection dimensions whereby coincident application of electrical impulses of one polarity in any two of said selection dimensions during a write interval causes that core jointly energized thereby to assume a first stable state of remanence in representing one binary digit and coincident application of electrical impulses of the other polarity in said two selection dimensions during a read interval causes that core jointly energized by said windings to assume a second stable state of remanence in representing the other binary digit, output windings embracing each core of said multi-dimensional array in which voltages are induced on pulsing at least one of said windings, pulse means coupled to the winding corresponding with a third selection dimension and operative between said read and write intervals to cause each of said cores linked thereby to assume a disturbed remanence state and selectively operable during said write interval to inhibit a change in state of said cores, means comprising a transformer having a secondary winding connected with said output winding and a primary winding series connected with the winding corresponding with said third selection dimension for cancelling out the effects due to operation of said pulse means, and a further transformer having a secondary winding connected with said output winding and primary winding series connected with the windings of said two selection dimensions whereupon a cancelling voltage is developed in opposition to that developed in the output windings by those cores excited by a winding in only one of said two selection dimensions.

17. Apparatus as set forth in claim 2 including rectifier means for coupling said pulse transformer secondary winding and said output winding.

18. Apparatus as set forth in claim 7 including full wave rectifier means for connecting said transformer secondary winding and said sense windings.

19. Apparatus as set forth in claim 10 including full wave rectifier means for connecting said transformer secondary winding and said sense winding.

20. Apparatus as set forth in claim 16 including full wave rectifier means for connecting the secondary windings of said transformer and said further transformer with said output winding.

References Cited in the file of this patent

UNITED STATES PATENTS

| | | |
|---|---|---|
| 2,680,819 | Booth | June 8, 1954 |
| 2,691,154 | Rajchman | Oct. 5, 1954 |
| 2,691,156 | Saltz | Oct. 5, 1954 |
| 2,734,184 | Rajchman | Feb. 7, 1956 |
| 2,769,925 | Saunders | Nov. 6, 1956 |

OTHER REFERENCES

Publications:

"Magnistors-Amplifiers or Storage Elements," "Electronic Design," April 1955, pages 26 and 27.

"Digital Information Storage in Three Dimensions Using Magnetic Cores," by Forrester, Journal of Applied Physics, pages 44 to 48, vol. 22, Number 1, January 1951.

"The MIT Magnetic Core Memory," by William M. Papian, reprinted from the Proceedings of the Eastern Joint Computer Conference, Washington, D.C., December 1953 (pp. 37–42 relied upon).

"A High Speed Shift Register Using Magnetic Binaries," by Fishman, presented at the Winter General Meeting of the IRE on March 5, 1952 (pp. 5 to 7 and Figs. 5, 6, and 7 and 10 relied on).